Jan. 15, 1957
S. M. BLITZER ET AL     2,777,866
RECOVERY OF TETRAALKYL-LEAD COMPOUNDS
Filed Aug. 17, 1953
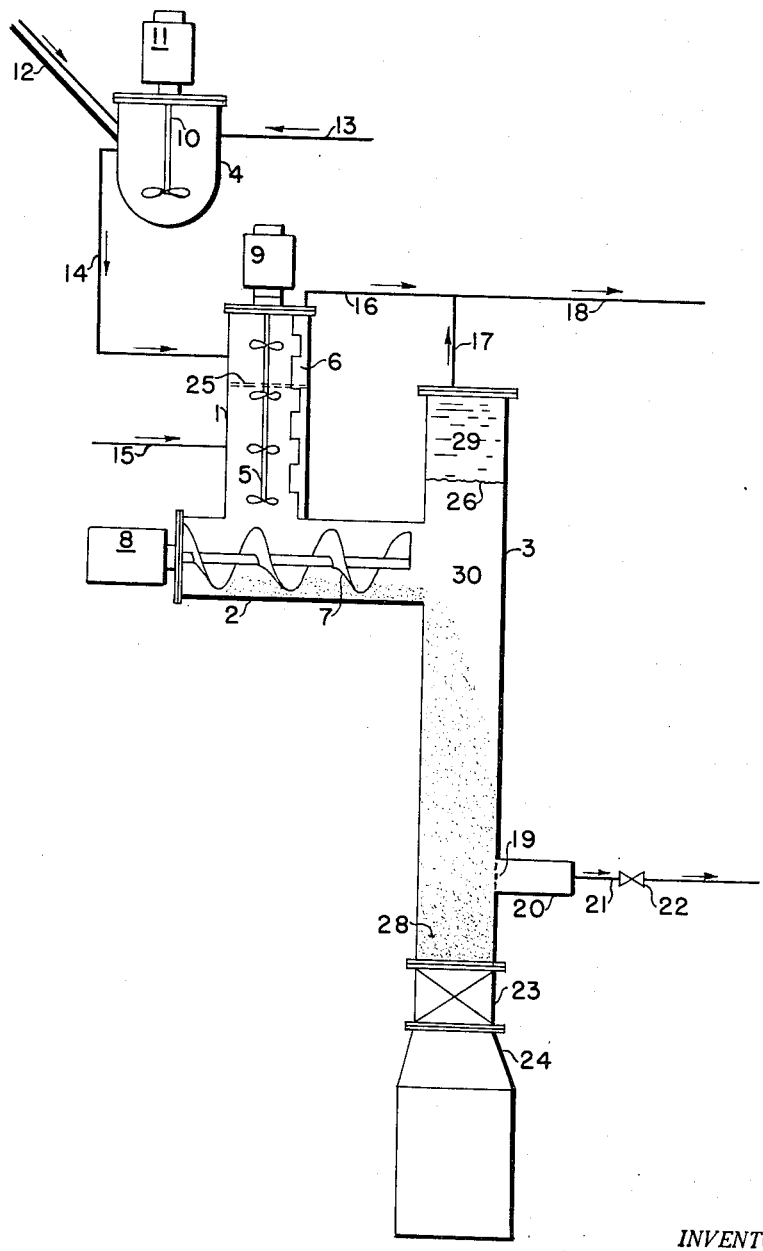
*INVENTOR.*
SIDNEY M. BLITZER
ORLAND M. BROWN
BY WILLIAM B. GRANDJEAN
Kenneth Swartwood
ATTORNEY United States Patent Office 2,777,866
Patented Jan. 15, 1957

2,777,866

RECOVERY OF TETRAALKYL-LEAD COMPOUNDS

Sidney M. Blitzer, Orland M. Brown, and William B. Grandjean, Baton Rouge, La., assignors to Ethyl Corporation, New York, N. Y., a corporation of Delaware Application August 17, 1953, Serial No. 374,746

7 Claims. (Cl. 260—437)

This invention relates to the manufacture of tetraalkyllead compounds such as tetraethyllead, tetramethyllead, tetraisopropyllead, dimethyl- diethyllead, and similar metallo organic compounds of lead. More particularly, the invention relates to a new and improved process for the isolation of these compounds from the other components for producing reactions. Specifically, our invention relates to the separation of a tetraalkyllead stream from the lead component of reacted or alkylated mixtures.

Among the important compounds, to recovery of which our process is applicable, is tetraethyllead which is widely used as an anti-detonant in internal combustion engine fuels. The manufacturing methods for this compound can be considered typical of the tetrahydrocarbon substituted lead compounds in general in that the final mixture is ordinarily characterized by having a relatively low fraction of the desired product. Virtually all proven reactions for synthesizing such materials result in product mixtures having a large fraction of finely divided, excess or unreacted lead present. In addition, the product mixtures include substantial proportions of inorganic compounds which are by-products of the producing reactions, for example, sodium chloride. It has been the almost universal practice in the recovery of these compounds to utilize a steam distillation operation. The details of affecting a steam distillation vary according to the individual character of the ethylation or alkylation mixtures. However, in all cases the steam distillation is intended for the purpose of vaporizing the tetraalkyllead and segregating it thereby from the excess lead present. The excess lead particles vary in actual size distribution, but have a large surface characteristic which is frequently responsible for occlusion and adherence of the alkyllead compound to such surfaces.

The steam distillation procedure involves immersing the reaction mixture, or a portion of the reaction mixture, in a body of water and passing steam therethrough for the vaporization of the tetraalkyllead. This technique provides reasonable recovery of the desired product, but suffers from various practical and economic disadvantages. Outstanding among these is the expense incurred owing to the cost of the steam which is inefficiently utilized during a large portion of the steam distillation. A further practical disadvantage is the frequent occurrence of agglomerated metallic masses within the distillation vessel which tend to plug the discharge lines and to bind the agitator and hamper the agitation of the steam still contents.

Alkylation product mixtures are generally of two broad types. These types or classes are based upon solely the apparent physical appearance of the mixture and include those of virtually apparent solid nature, and what is referred to as thin slurry alkylation mixtures. The foregoing are apparently masses of dry finely divided solids, resultant from carrying out the alkylation with a small or only a bare excess of the alkylating agents. The slurry type mixtures are the result of carrying out an alkylation with a substantial or large excess of the alkylating liquid. For example, in the preparation of tetraethyllead, this type of product mixture is the result of employing as much as 5, 10, or even 20 "theories" or stoichiometric equivalents of the liquid ethylating agent. In such cases, the mixture then ordinarily includes the finely divided lead, associated alkali or sodium chloride, excess alkylating agents and the tetraalkyllead. The tetraalkyllead is dissolved in the alkylating agent. In applying a steam distillation procedure to such systems the alkylating agent (usually an alkyl chloride such as methyl chloride, ethyl chloride or isopropylchloride) is first vaporized and then the steam distillation is carried out in the usual fashion.

It is the general object of our invention to provide a new and superior process for the separation of tetraalkyllead compounds from alkylation mixtures. A more specific object is to provide a process which has the result of isolating the tetraalkyllead particularly from the lead solids and also from the salt type by-products produced by the reaction. A further object is to provide a process which is particularly susceptible of efficient and high capacity and continuous operation. A further object is to obviate the agglomeration difficulties referred to above, encountered in prior utilization of steam distilling procedures. Yet another object is to provide the foregoing results without the necessity of a steam distillation. Additional objects of the invention will appear hereafter from the following detailed description and examples.

In its broadest sense, our invention comprises forming a multi-phase mixture which includes the lead solids of an alkylation reaction, the desired tetraalkyllead compound in an organic, water immiscible, solvent, and a dilute aqueous acid phase, and then stratifying this multi-phase system to a settled lead solids portion, an aqueous layer and a surmounting solvent layer containing the tetraalkyllead dissolved therein.

As will be apparent hereafter, the details of the process will vary to some degree dependent upon the character of the reaction mixtures from which the tetraalkyllead is to be separated, although the above described steps are common to all embodiments. Reaction mixtures are two general classes, viz.; reaction masses resembling dry solids as above described, and slurry type mixtures. In the slurry type mixtures, the tetraalkyllead is usually considered as fully distributed by solution in excess alkylating agent which is in most cases an alkyl chloride. The term "dry reaction mass" on the other hand, designates the class of mixtures from alkylation reactions having relatively little alkylating agent present, so that the end product mixture from the alkylation resembles the above described granular solids. The tetraalkyllead is intimately distributed and associated with the finely divided lead particles. In carrying out the process as applied to such "dry reaction mass" systems, it is necessary to form a slurry wherein a solvent for the tetraalkyllead is present and dissolves the desired compound product. On the other hand, in the case of the slurry mixtures from newly developed continuous alkylation methods, the desired slurry is existent as a preformed mixture.

In carrying out the process in general, the slurry is agitated with the aqueous acid solution. The thus formed heterogeneous liquid-solid mixture is then allowed to settle and form the desired settled lead solids phase, the aqueous phase and the surmounting solvent phase containing the tetraalkyllead.

The best manner of carrying out the process as well as the numerous and varied embodiments of which it is capable will be more readily understood from the following examples and description and an example of a preferred embodiment described in connection with the figure. The figure is a schematic drawing of apparatus suitable for preferred embodiments of the process, adapted for continuous operation.

To illustrate the adaptation of the process to recovery of tetraethyllead from a dry reaction mass, the examples below describe its recovery from the reaction mass resultant from the ethylation of monosodium lead alloy with ethyl chloride.

*Example 1*

Tetraethyllead was manufactured in the following manner. Comminuted monosodium-lead alloy and ethyl chloride were reacted together, in the proportions of 1000 parts by weight of alloy and 470 parts of ethyl chloride. The reaction was carried out in a closed autoclave or reaction kettle, the reactants being continuously stirred and maintained at a temperature of 85° C. and a pressure of approximately 75 pounds per square inch. At the conclusion of the reaction, the excess ethyl chloride, plus a minor quantity of hydrocarbon by-products of the reaction, were vented as a vapor to a recovery system, the pressure being thereby reduced to atmospheric pressure. The reaction mass was then discharged for tetraethyllead recovery operations. Such reaction mass is a dry, granular solids, a typical composition being given below:

| | Weight percent |
|---|---|
| Tetraethyllead | 22.3 |
| Sodium chloride | 19 |
| Sodium | 0.5 |
| Lead | 56.5 |
| Ethyl chloride, about | 1 |

Trace quantities of other impurity components are found in the reaction mass, including oxides of sodium and lead. It will be understood that the precise composition of the reaction mass from different manufacturing runs will vary slightly, according to minor variations in yield and other factors.

Separate portions of reaction mass, prepared as above described, were treated as in the following manner. A portion of the reaction mass was introduced into a cylindrical separation chamber having a height:diameter ratio of approximately 4:1. A measured quantity of ethyl chloride was then introduced, followed by an equal weight of very dilute hydrochloric acid. The proportions by weight of ethyl chloride:aqueous solution:reaction mass were 300:300:100. This mixture was then stirred by a propeller type agitator operating at a speed of about 500 revolutions per minute, the agitator elements having a diameter of approximately two-thirds the chamber. The mixture was stirred during the addition of the components and for a short time thereafter, the total agitation time being not more than three minutes. The agitation was then discontinued and the system left at rest for segregation by settling of the solid, aqueous and organic phases. The times required for a clear interface to be established and for full settling of the solids particles were noted.

Variable concentrations of hydrochloric acid were used in a series of duplicate recovery runs according to the above procedure. The concentration of the acid was varied through a range such that the final concentration of the aqueous phase was either slightly basic or acidic. At the termination of each run, the solids which were settled out were removed from the chamber and excess aqueous solution was removed by filtration. The residual tetraethyllead content was then extracted with benzene and determined by titration of an aliquot portion of the extract with an iodine reagent, thereby allowing an accurate measure of the removal of the tetraethyllead from the reaction mass. The results of these runs are given in the following table:

| Run Number | Tetraethyllead in Reaction Mass, Wt. percent | Final Aqueous Layer Acidity or Basicity | | Settling Times [1] | | Recovery Efficiency, percent | Remarks |
|---|---|---|---|---|---|---|---|
| | | Wt. percent HCl | Wt. percent NaOH | Liquids, Sec. | Solids, Sec. | | |
| 1 | 20.7 | | 0.2 | 30 | 120 | 99.2 | Part of solids collected at interface. |
| 2 | 24.1 | | 0.17 | 40 | 85 | 94.0 | Do. |
| 3 | 23.7 | | 0.17 | 120 | 180 | 98 | Heavy collection of solids at interface. |
| 4 | 23.8 | | 0.02 | 60 | 160 | 92 | Solids at interface and on walls. |
| 5 | 20.5 | 0.03 | | 4 | 7 | 96 | Sharp separation; water white liquid layers. |
| 6 | 22.6 | 0.015 | | 5 | 10 | 99 | Do. |
| 7 | 22.6 | 0.17 | | 10 | 3 | 97 | No interface solids, water white liquid layers. |
| 8 | 20.5 | 0.09 | | [2] 50 | 5 | 99 | Do. |

[1] Settling time approximately equivalent to one-half of reciprocal settling rate in seconds per foot.
[2] Slower settling or disengaging rate of liquid phases as result of excessively violent agitation.

The above tabulated results show clearly the high recoveries of tetraethyllead which can be realized by our process. Also illustrated is the great increase in throughput or capacity which accompanies the use of acid equivalent to or in slight excess of the quantity required to neutralize the basic character of the reaction mass. It will be noted that the average settling time for the solids in those runs terminating with a basic aqueous solution is 135 seconds. In contrast, the average time required in the acid terminating runs was only 6 seconds. A similar increase is noted in the settling or disengaging rate based upon the segregation of the aqueous and the organic phases. Thus the average liquid settling time for the runs terminating with a basic solution was over 60 seconds, whereas the average time required in the acid terminating runs was slightly over 6 seconds. The use of acid sufficient to neutralize the alkalinity in our process therefore accomplishes a capacity or throughput increase of at least tenfold.

In addition to the measurable quantitative effect of acidity on the rates at which the several components are separable, it will also be noted that the ultimate degree of separation was also substantially improved. A sharp, solids free, interface was obtained in each of the acid terminating runs. In contrast, when the alkalinity of the reaction mass was neutralized only in part, so that the final aqueous phase was basic, solids were collected at the liquid-liquid interface, or on the walls of the settling column.

We have found that a controlled acidity is a significant factor in assuring optimum separation of the solids from the organic phase. It has been observed that variation of acidity, which can be conveniently expressed as the pH of aqueous solution, profoundly influences the character of the predominantly lead particles. Thus, if the aqueous medium is too strongly acid, the particles tend to agglomerate and in aggravated cases, will "entrap" tetraethyllead within the enlarged particles. On the other hand, when the alkalinity of the reaction mass is not quite neutralized, so that the aqueous phase has a pH of above 7, the particles remain in a finely divided and slow-settling state. It has been found that the pH of the aqueous solution should be maintained below 7, the preferred or optimum condition for best results being a pH in the range of 4 to 6. It will be understood that the process is not thus rigorously limited, but that the advantages are realized in highest degree in this preferred range. This desired range can be provided by careful control of the concentration of the acid of the feed solution. Alternatively, and more conveniently, a buffering agent such as sodium acetate, or others familiar in the art, can be used in this connection.

As already indicated, the process is readily adaptable to slurry type feed mixtures, that is, product mixtures wherein a large excess of the liquid alkylating agent is provided and the tetraalkyllead is dissolved therein. Such an excess is provided by employing, for example, three or more times the stoichiometric requirements of the reaction involved. Generally, however, it is preferable to employ at least 2 parts by weight of the alkylating liquid to one part by weight of the lead containing alloy fed to the alkylation step. In the case of the ethyl chloride-monosodium lead alloy ethylation, such a charge ratio provides for an excess of over 600 percent ethyl chloride, and results in a product mixture wherein the tetraalkyllead is uniformly dissolved in ethyl chloride liquid excess.

Although the composition distribution of slurry reaction mixtures, excluding the excess alkylating liquid, is comparable to the dry reaction mixtures, the forms differ in that the particle sizes of the alkylated lead solids is apparently greatly less than the corresponding factor in dry reaction mass. The reason for this difference is not fully understood. However, it is believed that the thorough exposure of all surfaces of all alloy particles initially fed to the alkylating liquid in large excess results in breakup, owing to reaction, into the finer forms. Microscopic examination of the solids from a slurry alkylation mixture shows that individual particles are extremely small and also that they tend to exist in flocs or loose agglomerates, in contrast to a more granular or powdery appearance of the solids in dry reaction mass. Although the solids in a slurry reaction mixture are more finely subdivided than those in a dry reaction mass, the general principles of our process are applicable, as is apparent from the following examples.

*Example II*

Monosodium lead alloy was ethylated with liquid ethyl chloride, in the proportions of five parts by weight of ethyl chloride to one part of the alloy. At the termination of the ethylation, the reaction product mixture was a thin slurry of the following composition:

| | Weight percent |
|---|---|
| Tetraethyllead | 5.8 |
| Sodium chloride | 4.6 |
| Sodium | 0.1 |
| Lead | 12.8 |
| Ethyl chloride | 76.7 |
| | 100.0 |

Trace quantities of other impurities were also present, for example minor quantities of alkane hydrocarbons dissolved in the ethyl chloride, these hydrocarbons being by-products of the ethylation reaction.

Prior to the recovery operations described below, the reaction slurry was cooled to approximately room temperature. The small amounts of hydrocarbons dissolved in the liquid phase were removed by controlled venting. Separate portions of the reaction mixture, prepared as above described, were processed as described below.

The sample was charged to an agitated glass treating vessel, the agitation being sufficiently vigorous to fully suspend the solids. Dilute aqueous hydrochloric acid was rapidly added equivalent in volume to at least about one-fourth the volume of the slurry. Agitation was continued for a short period of several minutes but not exceeding five minutes. Upon termination of the agitation, the contents of the treating vessel were closely observed for rapidity of separation and the cleanliness of the separate liquid phases. In a series of operations, the volume of the acid and the concentration were varied, to define the effect of these factors on the efficiency of operation. The results of a series of such operations are given in the following table.

| | Acid | | | |
|---|---|---|---|---|
| Run No. | Volume Ratio, Acid: Slurry | Concentration Normality | Ratio, Moles HCl: Alkali as Na | Remarks |
| 11 | 1:4 | 0.35 | 2.6 | Good stratification in less than 15 seconds; clean interface; solids pebbly and discrete. |
| 12 | 1:4 | 0.25 | 1.8 | Similar to Run 11. |
| 13 | 2:4 | 0.25 | 3.6 | Do. |
| 14 | 3:4 | 0.25 | 5.4 | Do. |
| 15 | 1:4 | 0.15 | 1.1 | Do. |
| 16 | 2:4 | 0.15 | 2.2 | Do. |
| 17 | 3:4 | 0.15 | 3.3 | Do. |
| 18 | 1:4 | 0.05 | 0.37 | Solids remained light, fluffy and apparently non-settleable; distributed in liquid organic layer and at interface. |
| 19 | 2:4 | 0.05 | 0.74 | Similar to Run 18. |
| 20 | 3:4 | 0.05 | 1.1 | Slightly small, but rapidly settling, grainy solids, clear interface formed. |

From the foregoing results, it is apparent that the relative volume proportions of the aqueous acid solution and the alkylated slurry can be varied through a wide range and good results will be obtained. In every case in which rapid stratification of the several components was obtained and clear liquid layers were thus provided, segregation of over 99 percent of the tetraethyllead from the settled solids was provided. Accordingly, the process is readily adaptable to slurry alkylation mixtures and excellent recoveries are provided with such feeds as well as with "dry" reaction masses as heretofore described. As in other embodiments of the process, an important factor in assuring a rapid and high rate of recovery is the control of the amount of acidity to provide a slightly acidic aqueous phase after treatment.

It has previously been believed that special treatment of slurry alkylation mixtures was essential in applying the process to such feed streams. It has been proposed that the use of small amounts of water as a pretreating agent is beneficial for such feeds. It has now been found, however, that such pretreating is not absolutely necessary, although it is helpful in certain cases. When the preceding alkylation has been carried out efficiently and to a reasonable degree of completion, good results have been provided without any pretreating. To illustrate the applicability of the process to alkylated slurry mixtures, a series of over 30 runs were made, in which a pretreatment with a small amount of water (stoichiometrically equivalent to one mole per one atom of sodium equivalent to the alkalinity present) was provided in approximately one-half of the runs. In the rest of the runs, no pretreating step was provided. In every case, the recovery of the tetraethyllead was over 98 percent, the average recovery being over 99 percent with or without a pretreating step.

A significant advantage of our process is its ready adaptability to continuous operations, it being well recognized that continuous operations provide marked economic advantages over batch type processes. The precise apparatus used may, of course, take many forms consistent with good mechanical design principles. A typical and preferred apparatus is illustrated by the accompanying figure, which is particularly suited for carrying out the operation continuously. Referring to the figure, the main units of the apparatus include a vessel 4, a mixing chamber 1, a transfer chamber 2, and a final separating or settling column 3. A chute or conduit 12 provides for feed of a reacted mixture to the vessel 4. The feed can be either a dry reaction mass or a reacted slurry mixture. In instances wherein a dry reaction mass is fed, a line 13 provides for introduction of solvent to the vessel 4, which is fitted with an agitator 10 and drive motor for forming a slurry, or for maintaining the solids in motion when a slurry feed is provided directly.

An overflow line 14 conducts the slurry from the vessel 4 to the top portion of the mixing chamber 1. Line 15 is the feed line for the dilute aqueous acid. Thorough agitation of aqueous phase, the solvent solution and the solid components of the mixture, is assured by the stirrer assembly 5 and drive motor 9, in conjunction with side baffles 6.

The mixer chamber 1 is connected to the final settling column 3 by a lateral transfer chamber 2, which houses a conveyer element 7 powered by motor 8. This conveyer serves to transport solids to settling column 3, the flow of liquid components being provided by hydrostatic head.

A pressure equalizing line 16 leads from the top of the mixing chamber 1 to line 17 from the top of the settling column 3. Joining to line 18, lines 16 and 17 assure equal static pressures in the mixer 1 and settling column 3, and also serve as discharge means for the solution of tetraalkyllead obtained in the process.

A removable hopper 24 is attached to the bottom of settling column 3 for receiving solids through valve 23. A side arm or nozzle 20 is the discharge port for separate withdrawal of the aqueous phase, a screen 19 preventing inclusion of solids in the aqueous phase. A valve 22 allows control of the rate of discharge of the aqueous liquid through line 21.

It will be apparent that the apparatus employed for our process may take numerous alternative forms other than the foregoing embodiment. Thus, if desired, the vessel 4 may be omitted and the mixing chamber 1 will then be appropriately enlarged.

The manner of carrying out our process is illustrated by the following example, which describes the important embodiment of our process of recovering tetraethyllead from a dry reaction mass resultant from the ethylation of lead, as monosodium alloy, with ethyl chloride.

*Example III*

Tetraethyllead is formed by ethylating comminuted monosodium-lead alloy, NaPb, with approximately 70 percent excess ethyl chloride. At the conclusion of the ethylation period, the unreacted ethyl chloride is vaporized by reducing the pressure on the still warm charge. The reaction mass is then cooled to about 25 to 40° C. prior to feeding through chute 12 to the slurrying vessel 4, although such cooling is not essential. Concurrently with the feed of reaction mass to the slurrying vessel, ethyl chloride liquid is fed through line 13 in the proportions of about 2.5 parts by weight to 1.0 part of reaction mass. These feed streams are continuously stirred by agitator 10, an average residence time of 2 to 3 minutes being maintained in the slurrying vessel. This slurrying operation uniformly dissolves the tetraethyllead present in the ethyl chloride, the slurry then having the following approximate composition:

| | Weight percent |
|---|---|
| Tetraethyllead | 7.1 |
| Ethyl chloride | 71.6 |
| Lead | 15.4+ |
| Sodium chloride | 5.6+ |
| Sodium | 0.2+ |
| | 100.0 |

It will be seen that the slurry consists of about 21 percent by weight solids in a liquid phase which is about a 9 weight percent solution of tetraethyllead in ethyl chloride. Overflowing through line 14, this slurry is delivered to mixing chamber 1.

Concurrently with the feed of slurry, a dilute hydrochloric acid stream is introduced to the mixing chamber 1 through line 15. For best operation, it is preferred to maintain a uniform flow of acid to the system, making appropriate adjustment of the strength of the acid as required. Ordinarily, a preferred flow rate is that roughly corresponding to the weight flow of the solvent used. This is by no means an absolute requirement, however, and quantities of the aqueous liquid of the order of about one-half to several times the amount of solvent will provide good results. The concentration of hydrochloric acid is adjusted to provide a slight excess, of the order of 5 to 15 percent, of the amount needed to neutralize the alkalinity of the reaction mass. Thus, in the present instance, with alkalinity in the reaction mass corresponding to 0.8 weight percent sodium, a concentration of 0.6 weight percent hydrogen chloride in the aqueous feed provides a 20 percent excess.

The agitation in the mixing chamber 1 intimately contacts all components. In the course of the mixing, the alkalinity of the reaction mass is neutralized and a substantial portion of the sodium chloride content of reaction mass is dissolved in the aqueous system. Concurrently, the solution is virtually displaced from the insoluble solid components, so that, in effect the reaction mass solids are all transferred to the aqueous portion of the system. A residence time of several minutes for the liquid components in the mixing chamber is ample, and the chamber is sized accordingly.

Depending upon the vigor of the agitation in the mixing chamber 1, an interface 25 may occasionally appear. However, we find it preferable to mix with sufficient intensity so that the system at this point is well churned throughout the mixing space.

Discharging from the mixing chamber 1 to transfer chamber 2, the several components flow to settling column 1. As conditions in the transfer chamber are relatively quiescent, the undissolved solids begin to settle at this point, and are moved through the transfer chamber by conveyer 7. The liquid phases also begin to separate, that is, smaller droplets of the ethyl chloride solution begin to combine into larger drops or portions, or even into a fully continuous phase. This disengaging is continued in settling column 3. Here the ethyl chloride solution 29 is floated above the aqueous layer 30, a sharp interface 26 being formed. The solids are settled out into a bottom zone, forming a portion of high solids content 28. The solids from the monosodium-lead alloy ethylation form on free settling, a slurry containing up to 50 or 60 weight percent solids, which is withdrawn cyclically or steadily through valve 23 and dropped into receiving hopper 24.

The residence time of the materials in settling column 3 is not critical owing to the rapid separating characteristics imparted to both the solids and the liquid phases. As a general rule, an average residence time of 5 minutes or over assures that the ethyl chloride solution separation is of the order of 98 percent or better. This solution is transmitted through line 18 to suitable concentration operations, such as a vacuum fractionation, to strip the ethyl chloride from the dissolved tetraethyllead. The solids collected in hopper 24 are predominantly lead metal particles and are subsequently dried. They are then remelted and re-alloyed with sodium metal for usage in the ethylation step to produce additional tetraethyllead.

The pressure and temperature at which our process is operated are not critical provided that several requirements are satisfied. Thus, in the case of the more volatile solvents such as ethyl chloride, the pressure is necessarily sufficiently elevated to prevent vaporization of the solvent at the operating temperatures employed. Operating temperatures of the order of 50° C., or preferably below this temperature, are preferred. Temperatures approximating ambient temperatures are desired because the pressure requirements on the system are correspondingly only moderate. Further, moderate temperature minimizes any deleterious effect of acidity, in the aqueous solution, upon the tetraalkyllead present in the system. Fortunately, it has been found that the residence time in the process, and the concentration of the acid used, are such that decomposition of the tetraalkyllead compound is negligible at the operating temperatures preferred. Thus, in contacting a solution of 8 weight percent tetraethyllead in ethyl chloride with 0.6 percent hydrochloric acid, by mixing for five minutes at room temperature, the decomposition of tetraethyllead is less than 0.001 weight percent. The operating temperature and pressure in the process are thus dictated in large measure by the solvent employed. In the foregoing example, with ethyl chloride as the solvent, operating pressures of only 15 to 20 pounds per square inch, gauge, will normally be encountered at ambient temperatures.

It will be understood that the process is not limited to a single solvent and that there is considerable latitude in the choice of a particular solvent for an embodiment of the process. The several alkylating agents, especially the alkyl chlorides, such as ethyl chloride, methyl chloride, or isopropyl chloride, are particularly suitable in that they exhibit in high degree the desired attributes needed for efficient operation. Such attributes include high solvency for the tetraalkyllead, stability in the presence of dilute acid, and immiscibility with water. A further desired attribute is that the density of the tetraalkyllead solution should be less than the density of the aqueous solution present. As a general rule, and to assure ease of separation, we prefer to operate with proportions of solvent such that the density of the solution is less than that of water. This is not an absolute limitation, inasmuch as the density of the aqueous phase increases owing to solution of soluble by-products of the reaction, e. g., sodium chloride—in the aqueous phase. However, by controlling the proportions of the solvent so that the density of the solution is less than that of water, a differential in the specific gravities of the two liquid phases is assured whereby the aqueous portion rapidly settles and the tetraalkyllead solution is quickly floated.

As a practical matter, the desired differential in density of the two liquid phases is normally assured by providing sufficient solvent to allow ready slurrying of the dry reaction mass in the solvent. The necessary requirements for efficient slurrying will vary slightly with several factors, e. g., the precise density of the solvent employed, and the concentration of the tetraalkyllead in the reaction mass. However, as a general rule, it has been found that a solvent:reaction mass weight ratio of 2.0:1.0, is a practical minimum. Below this ratio, the system tends to resemble a mud and to be extremely difficult to transfer to the mixing operation by overflow lines. A preferred operating ratio is somewhat higher than the above minimum, being in the range of 2.5 to 4.0 parts of solvent by weight to one part of reaction mass. Ratios in the upper part of this range, or higher, are to be avoided, as they result in a very dilute tetraalkyllead concentration in the solution stream delivered by the process, with an attendant increase in the expense of the subsequent concentration of tetraethyllead by fractionation.

In addition to the preferred alkyl chloride solvents, many other efficient organic solvents are available in the art and if utilized equally good results will be obtained. As examples of such alternative solvents can be mentioned the aromatic hydrocarbons, for example benzene, amyl-benzene, 1,2-diethyl benzene and other alkyl substituted benzenes, the straight and branched chain and cyclic alkane hydrocarbons, such as neohexane, isopentane, cyclohexane, n-hexane, n-heptane, 2,2,4-trimethylpentane, and the like. In general, the oxygen containing solvents, such as the lower molecular weight alcohols, ketones, esters and aldehydes are avoided because they are relatively inefficient solvents for the tetraalkyllead compounds. In addition, such solvents are frequently fairly soluble in aqueous systems, so that good separation of the tetraalkyllead in a separate phase is not thereby obtained. We therefore find it advantageous to always select a solvent which is substantially insoluble in water or aqueous solutions.

The intimate contacting of the reaction product mixture with the aqueous solution and the organic solvent is accomplished preferably by mechanical agitation. The degree of agitation should, however, be limited to a certain extent. It has been found that prolonged and extremely vigorous mixing of the predominantly lead particles in a reaction product mixture sometimes results in cohesive growth into particles of appreciable size. It appears that such growth can best be analogized to cold working ductile metals, as distinguished from agglomeration resultant from the dilute acid treatment. Although such mechanically-induced agglomeration is possible, in practice it is seldom encountered except under extreme conditions, so that for most practical purposes it does not impose a limitation on our process. For example, in the continuous embodiment of our process heretofore described, peripheral speeds of the agitator elements of the order of 8 to 10 feet per second were used without deleterious effect.

It will be apparent to those skilled in the art that our invention can be practiced in many embodiments without departing from the scope of the invention, as defined in the following claims.

This application is a continuation-in-part of our application Serial No. 244,652, filed August 31, 1951, now forfeited.

We claim:

1. The improved process of separating tetraethyllead and the solids of a reaction mixture, said solids including finely divided lead, alkali metal chloride, and minor quantities of alkaline reacting components, comprising forming a slurry of the reaction mixture with ethyl chloride and dissolving the tetraethyllead therein, the ethyl chloride being provided in the proportions of at least two parts by weight to one part of the sum of the weights of the tetraethyllead and the solids, intimately mixing the so-formed slurry with an aqueous dilute acid solution in proportions of at least one part by volume of solution to four parts by volume of the slurry, and providing acid in excess of the quantity required to neutralize the alkaline reacting components, then maintaining the mixture at quiescent conditions for a time sufficient to settle the solids and stratify the liquids, the solution of tetraethyllead being floated on the aqueous solution.

2. The process of claim 1 further defined in that the aqueous solution contains acid sufficient to provide a pH of 4 to 6 after mixing.

3. The process of claim 2 further defined in that the ethyl chloride is provided in proportions of from about 2.5 to 4 parts by weight to one part of the sum of the weights of the tetraethyllead and the solids.

4. The process for recovery of tetraethyllead from a dry ethylation mixture, said mixture including tetraethyllead, finely divided lead and alkali chloride and minor quantities of alkaline reacting components and having substantially no separate liquid phase, comprising slurrying with ethyl chloride and dissolving the tetraethyllead therein, the ethyl chloride being in proportions of from about 2.5 to 4.0 parts by weight to one part of ethylation mixture, intimately mixing the slurry with a dilute aqueous acid solution, said solution being from ½ to 2 parts by weight to one part by weight of the ethyl chloride and providing acid in excess of the quantity required to neutralize the alkaline reacting components of the ethylation mixture, then maintaining the mixture at quiescent conditions for a time sufficient to settle the solids and stratify the liquids, the solution of tetraethyllead being floated on the aqueous solution.

5. A process for manufacture and recovery of tetraethyllead comprising ethylating a sodium lead alloy with ethyl chloride in the proportions of about five parts by weight of ethyl chloride to one part by weight of alloy, providing thereby an ethylated slurry including a solution of tetraethyllead in the ethyl chloride, unreacted finely divided lead, sodium chloride and alkaline components, intimately mixing said slurry with dilute aqueous acid solution for a period of less than five minutes, the ratio by volume of aqueous solution to slurry being at least 1:4 and the acid being in excess of the quantity required to neutralize the alkaline reacting components of the slurry, then maintaining the mixture at quiescent conditions for a time sufficient to settle the solids and stratify the liquids, the solution of tetraethyllead being floated on the aqueous solution.

6. The process of claim 5 further defined in that the aqueous solution contains acid sufficient to provide a pH of 4 to 6 after mixing.

7. The process for separation of a slurry product mixture produced by the reaction of at least two parts by weight of ethyl chloride to one part of monosodium lead alloy comprising feeding together said slurry and a dilute aqueous acid solution and agitating together for a period not over five minutes and sufficiently vigorously to prevent formation of an interface, then maintaining the mixture at quiescent conditions for a time sufficient to settle the solids and stratify the liquids, the solution of tetraethyllead being floated on the aqueous solution, the said slurry product mixture including tetraethyllead dissolved in ethyl chloride, excess finely divided lead, sodium chloride and minor quantities of alkaline reacting components, the volume proportions of dilute aqueous acid solution: slurry being at least 1:4 and the acid in the solution being in excess of the quantity required to neutralize the alkaline reacting components of the reaction slurry.

References Cited in the file of this patent
UNITED STATES PATENTS

| | | |
|---|---|---|
| 2,038,704 | Bohe | Apr. 28, 1936 |
| 2,622,093 | Blitzer et al. | Dec. 16, 1952 |
| 2,644,827 | Neher et al. | July 7, 1953 |
| 2,661,361 | Grandjean | Dec. 1, 1953 |